(12) United States Patent
Curtis et al.

(10) Patent No.: US 6,370,814 B1
(45) Date of Patent: Apr. 16, 2002

(54) CONFORMABLE TERMITE BAIT CONTAINER FOR WALLS AND CORNERS

(75) Inventors: David H. Curtis, 172 Lonetown Rd.; Michael R. Latronica, 177 Lonetown Rd., both of Redding, CT (US) 06896; John J. Hamilton, Brewster, NY (US)

(73) Assignees: David H. Curtis; Michael R. Latronica, both of Redding, CT (US)

( * ) Notice: Subject to any disclaimer, the term of this patent is extended or adjusted under 35 U.S.C. 154(b) by 0 days.

(21) Appl. No.: 09/488,654

(22) Filed: Jan. 20, 2000

(51) Int. Cl.[7] .................................................. A01M 1/20
(52) U.S. Cl. ........................... 43/132.1; 43/131; 43/121
(58) Field of Search ....................... 43/124, 131, 132.1, 43/121, 107

(56) References Cited

U.S. PATENT DOCUMENTS

| | | | | |
|---|---|---|---|---|
| 584,378 A | * | 6/1897 | Lewis | 43/107 |
| 1,715,173 A | * | 5/1929 | Opitz | 43/131 |
| 2,101,988 A | | 12/1937 | Epstein | |
| 2,150,891 A | * | 3/1939 | Tennison | 43/107 |
| 2,177,670 A | * | 10/1939 | Peirson | 43/107 |
| 2,359,341 A | * | 10/1944 | Weil | 43/131 |
| 2,869,281 A | * | 1/1959 | Teuscher | 43/131 |
| 3,177,610 A | * | 4/1965 | Smith | 43/131 |
| 3,304,646 A | | 2/1967 | Staley | |
| 4,349,981 A | * | 9/1982 | Sherman | 43/131 |
| 4,395,842 A | * | 8/1983 | Margulies | 43/121 |
| 4,804,142 A | | 2/1989 | Riley | |
| 4,866,877 A | * | 9/1989 | Barak | 43/121 |
| 4,921,696 A | | 5/1990 | Vander Meer et al. | |
| 4,959,924 A | | 10/1990 | Martin | |
| 5,022,180 A | | 6/1991 | Albanese | |
| 5,406,744 A | * | 4/1995 | Schneider et al. | 43/131 |
| 5,502,919 A | | 4/1996 | Ciarletta | |
| 5,531,043 A | * | 7/1996 | Shiboh | 43/131 |
| 5,555,672 A | | 9/1996 | Thorne et al. | |
| 5,609,879 A | | 3/1997 | Myles | |
| 5,778,596 A | | 7/1998 | Henderson et al. | |
| 5,832,658 A | * | 11/1998 | Randon | 43/131 |
| 5,937,571 A | * | 8/1999 | Megargle et al. | 43/131 |
| 6,058,646 A | * | 5/2000 | Bishoff et al. | 43/131 |
| 6,233,865 B1 | * | 5/2001 | Curtis et al. | 43/131 |

FOREIGN PATENT DOCUMENTS

WO          WO-93/23998 B1  *  12/1993

* cited by examiner

*Primary Examiner*—Darren W. Ark
(74) *Attorney, Agent, or Firm*—Clifford L. Tager

(57) ABSTRACT

The present invention is directed to a conformable termite bait container capable of being located either against a first substantially planar surface or against a corner defined by the intersection of a second and a third substantially planar surface. The conformable termite bait container preferably comprises a housing which includes a back wall, front wall and side structure operatively connected between the front and back walls. The back wall, front wall and side structure form an interior cavity therebetween capable of storing termite bait. A plurality of openings are located on the housing to allow termites to access the bait locatable therewithin. A first structurally-weakened area is located along the longitudinal length of the back wall, figuratively dividing the back wall into a first back portion and a second back portion. A second and a third structurally-weakened area are located along the longitudinal length of the front wall, the second structurally-weakened area being offset from the third structurally-weakened area a predetermined distance and defining a removably-detachable front wall section. In use, the back wall is capable of being located against the first substantially planar surface. Alternatively, upon the removal of the removably-detachable front wall section, the back wall is capable of being bent about the first structurally-weakened area such that the first back portion and second back portion are capable of being located against the second and third substantially planar surfaces, respectively, defining the corner.

16 Claims, 2 Drawing Sheets

CONFORMABLE TERMITE BAIT CONTAINER FOR WALLS AND CORNERS

BACKGROUND OF THE INVENTION

1. Technical Field

The present invention is directed to an insect bait container. More particularly, the present invention is directed to a termite bait container capable of being located either against a flat surface, such as a wall, or in a corner.

2. Background Information

Termite bait containers that are capable of being located against a wall are well known in the art. Such containers typically comprise a rectangular housing having a back, front, opposing side walls, a top and bottom walls. Termite bait, which is typically termite-ingestible material impregnated with poison, is located within the housing.

The back of the housing is typically attached to a wall in the path of the termites. The termites enter the termite bait container via a plurality of holes located in the side, top and bottom walls of the housing, and ingest the termite bait on their way through the housing. The bait is carried back to the termite nest, where it is distributed and used by the termites for food consumption. Once the poison has been carried back to the termite nest, the poison's toxicity begins to exterminate the termites.

Such prior art termite bait containers are typically suitable for placement against a flat surface and are not effectively disposed in a corner defined by the intersection of two planar surfaces, since only the surface covered by the back wall of the container is adequately covered.

As a result, even if such prior art termite bait containers are located against a corner, only one surface of the corner could effectively be in the termite path, i.e., the surface covered by the back wall of the container.

Accordingly, there is a need for a termite bait container which is capable of being disposed in a corner.

SUMMARY OF THE INVENTION

The present invention is directed to a conformable termite bait container capable of being located either against a first substantially planar surface or against a corner defined by the intersection of a second and a third substantially planar surface.

In a preferred embodiment of the present invention, the conformable termite bait container comprises a housing which includes a back wall and a front wall, each having a longitudinal length, width and depth, and side structure operatively connected between the front wall and the back wall. The back wall, front wall and side structure form an interior cavity therebetween capable of storing termite bait.

A plurality of openings are preferably located on the housing to allow termites to enter the housing and access the bait locatable therewithin.

A first structurally-weakened area is preferably located along the longitudinal length of the back wall, the first structurally-weakened area figuratively dividing the back wall into a first back portion and a second back portion.

A second and a third structurally-weakened area are preferably located along the longitudinal length of the front wall, the second structurally-weakened area being offset from the third structurally-weakened area a predetermined distance and defining a removably-detachable front wall section.

In use, the back wall is capable of being located against the first substantially planar surface. Alternatively, upon the removal of the removably-detachable front wall section, the back wall is capable of being bent about the first structurally-weakened area such that the first back portion and second back portion are capable of being located against the second and the third substantially planar surfaces, respectively, defining the corner.

In the preferred embodiment, the first, second and/or third structurally-weakened areas consist of an indent, a plurality of perforations, a groove and/or a channel.

Termite bait is preferably located within the interior cavity of the housing. The termite bait preferably comprises a plurality of termite-ingestible sheets capable of being bent to substantially conform to the shape of the first back portion and second back portion. Alternatively, the termite bait preferably comprises a plurality of termite-ingestible segments.

DESCRIPTION OF THE PREFERRED EMBODIMENTS

The present invention is directed to a conformable termite bait container capable of being located either against a first substantially planar surface or against a corner defined by the intersection of a second and a third substantially planar surface.

In a preferred embodiment of the present invention, the conformable termite bait container comprises a housing having an interior cavity capable of storing termite bait.

Figure 1:
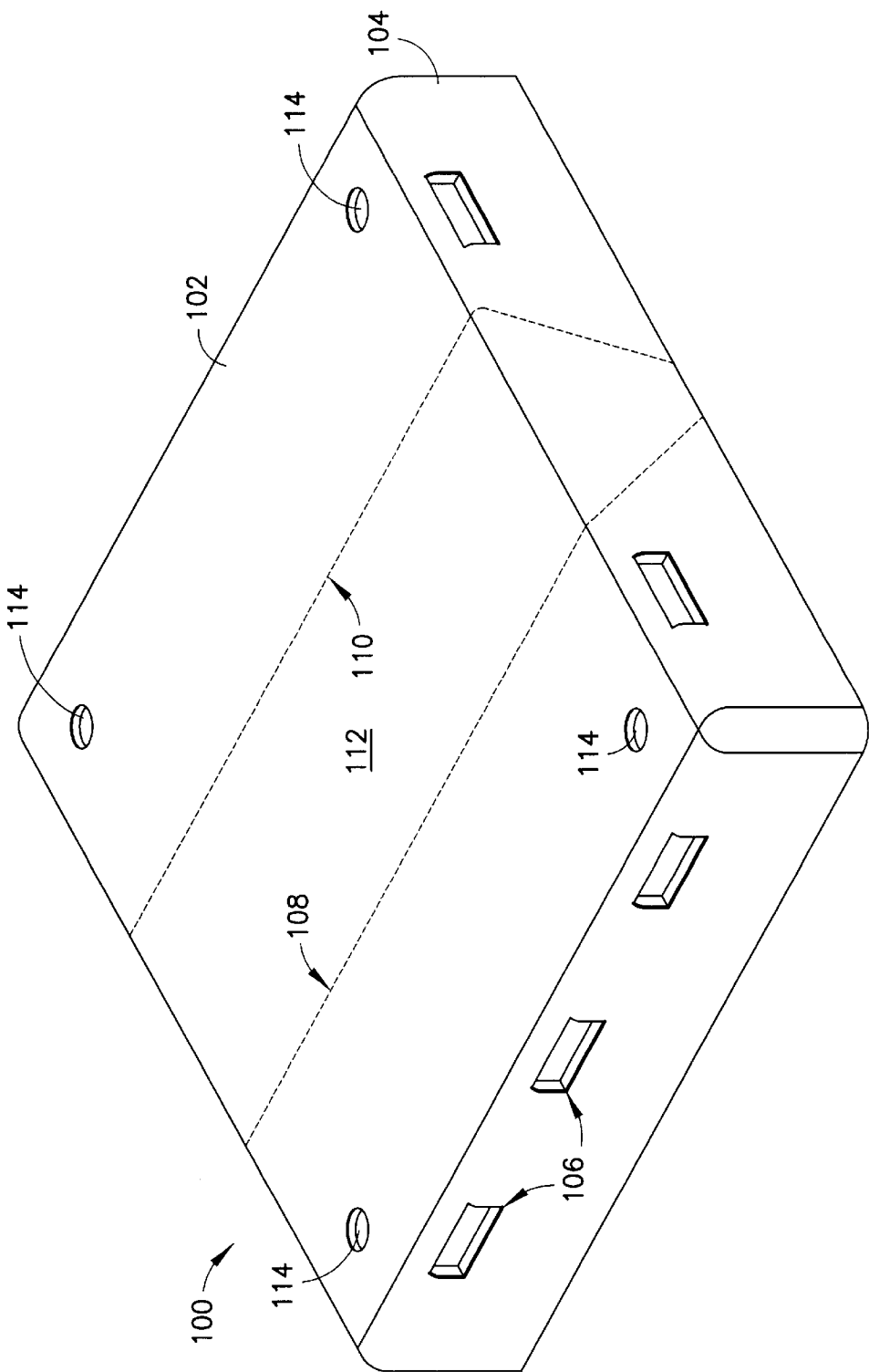
FIG. 1 is an orthogonal view of a preferred embodiment of the top portion of the housing of the present invention.
Figure 2:
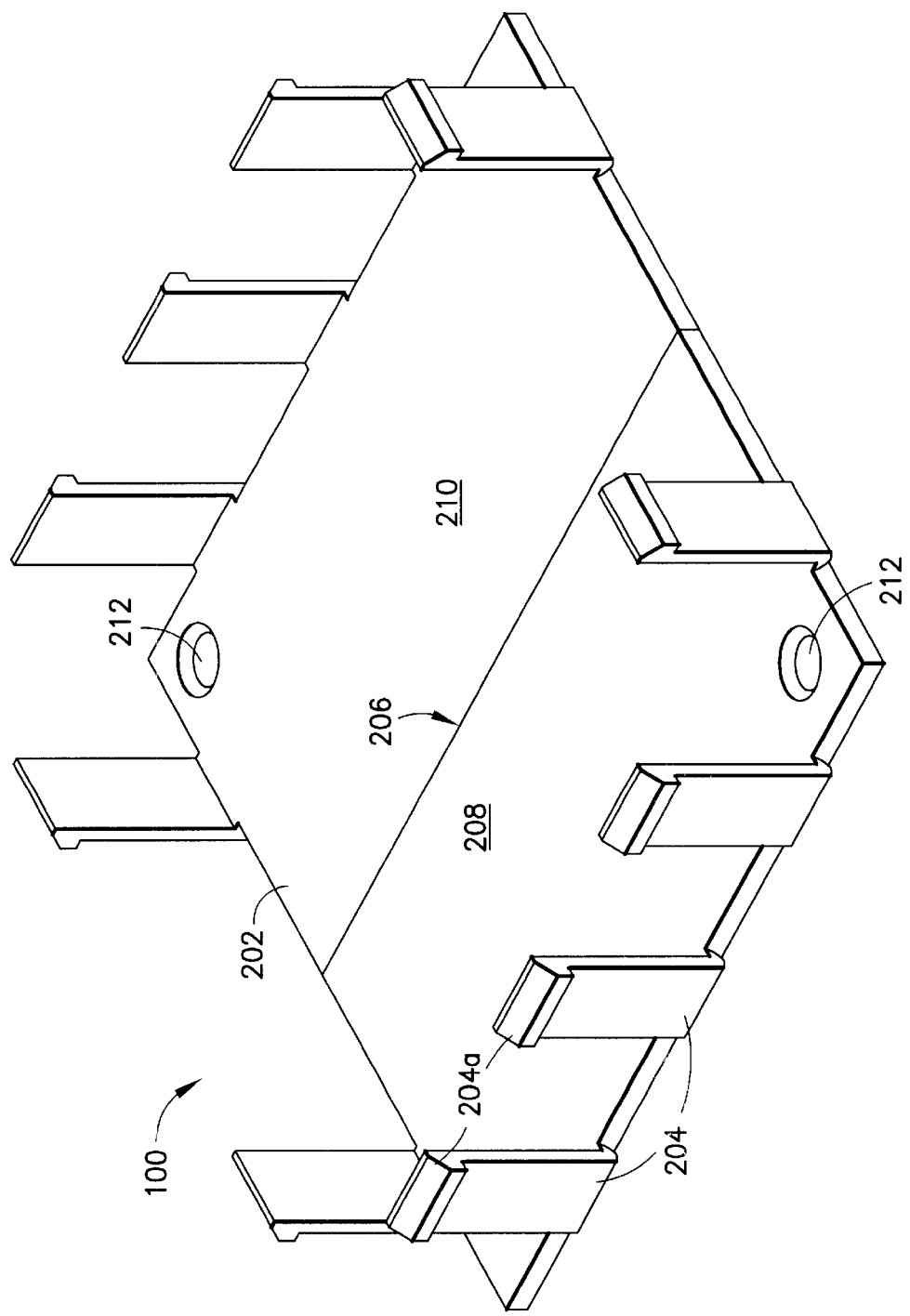
FIG. 2 is an orthogonal view of a preferred embodiment of the bottom portion of the housing of the present invention.

Turning now to FIGS. 1 and 2, an orthogonal view of the top portion and bottom portion of the housing, respectively, is shown.

With reference to FIG. 1, the top portion of housing 100 preferably comprises front wall 102 and side walls 104 attached thereto and integral therewith. A plurality of slots 106 are preferably located within side walls 104.

First and second tear strips 108, 110 are preferably located along the longitudinal length of front wall 102. Tear strips 108 and 110 are offset from each other a predetermined distance, with the area therebetween hereby defined as removably-detachable front wall section 112. Tear strips 108 and 110 preferably continue along opposing side walls 104 at a 45° angle.

Tear strips 108 and 110 are preferably structurally-weakened areas to facilitate the removal of front wall section 112 from the top portion of the housing, and preferably comprise a V-shaped channel cut into the front and side walls. Alternatively, the tear strips may comprise an indent, a plurality of perforations, a groove or other suitable configuration to weaken the structural integrity thereof.

With reference to FIG. 2, the bottom portion of housing 100 preferably comprises back wall 202 and a plurality of legs 204 attached thereto and integral therewith.

Back wall 202 preferably comprises pivot axis 206 located along the longitudinal length of the back wall, pivot axis 206 figuratively dividing the back wall into first back portion 208 and second back portion 210.

Pivot axis 206 is preferably a structurally-weakened area to facilitate the bending of first and second back portions 208, 210 thereabout, and preferably comprises a V-shaped channel cut into the back wall. Alternatively, the pivot axis may comprise an indent, a plurality of perforations, a groove or other suitable configuration to weaken the structural integrity thereof.

As discussed more fully with reference to application Ser. No. 09/387,958, now U.S. Pat. No. 6,233,865, incorporated herein by reference, front wall 102 (FIG. 1) is preferably operatively connected to back wall 202 via the plurality of legs 204, the terminal portion of each leg engaging a correspondingly located slot 106 located within side wall 104.

In the preferred embodiment, the lower terminal end of each leg 204 is secured to a terminal edge of back wall 202, while protrusion 204$a$, located on the upper terminal end of each leg, is engagably securable within slot 106. Protrusion 204$a$ is preferably beveled to assist the assembly of legs 204 within slots 106.

Termite bait (not shown) is preferably locatable within the cavity formed by the front wall, back wall and side walls. Termite bait is well known in the art, and preferably comprises a plurality of cardboard sheets impregnated with suitable poison. Alternatively, the termite bait can comprise shredded cardboard or other small segments impregnated with suitable poison.

In the preferred embodiment, the relative position of slots 106 with respect to the height of legs 204 are dimensioned to provide a gap between the bottom of side walls 104 and the top of back wall 202, thereby allowing termites to enter and exit the cavity of the housing to access the bait. Alternatively, the bottom of the side walls can substantially contact the top of the back wall, with a plurality of suitable holes or other openings being located within the side walls to provide access.

In use, the termite bait container of the present invention may be placed against a flat surface, such as a wall, in an area of termite infestation.

Alternatively, the termite bait container of the present invention may be placed in a corner by removing front wall section 112 from the top portion of the housing, and suitably bending first and second back portions 208, 210 about pivot axis 206 to conform the back wall to the shape of the corner, causing the remaining portions of front wall 102 to also conform thereto.

Thereafter, screws (not shown) may be driven through holes 114 (top portion of housing, FIG. 1) and corresponding holes 212 (bottom portion of housing, FIG. 2) to secure housing 100 in its desired location. Alternatively, two-sided tape, glue or other suitable adhesive may be used to secure the housing in place.

The top and bottom portions of the housing are preferably each manufactured as a single unit from molded or extruded plastic approximately 1.5 mils thick. Thus, the area of transition between front wall 102 and side walls 104 is preferably curvilinear, and the terminal ends of back wall 202 are preferably beveled, for ease of manufacture.

The approximate overall dimensions of the housing is preferably 3.5 inches high×4 inches wide×1 inch deep. These dimensions allow the housing to be placed on its side (i.e., the 3.5' dimension positioned horizontally) to be affixed to a 3.5' wide stud without the housing interfering with the drywall or sheet rock located on either side thereof. These dimensions also allow the housing to be placed upright (i.e., the 3.5' dimension positioned vertically) when being placed in a corner or against surfaces greater than 3.5' wide.

There are preferably two legs on each opposing longitudinal side, and three legs each on opposing transverse side, each leg 204 preferably having the approximate dimensions of ⅞ inch high×⅜ inch wide×1.5 mils thick.

Pivot axis 206 is preferably located along the longitudinal center line of the back wall. The predetermined distance between tear strips 108 and 110 is dependent upon the relative distance between the front and back walls, as well as the desired spacing (if any) between the tear strips when the termite bait container is bent to fit in a corner.

The termite bait, which preferably comprises a plurality of cardboard sheets impregnated with poison, is preferably structurally weakened along its central longitudinal axis to facilitate its bending together with the bending of the termite bait container of the present invention. Structural weakening can be achieved by scoring, pre-bending or other suitable means.

While the conformable bait container of the present invention has been described with reference to termites and termite bait, the present invention finds equal utility employed as a bait container for various other undesirable insects or bugs, such as ants, roaches and the like, with the conformable bait container housing suitable bait therein.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. A conformable termite bait container capable of being located either against a first substantially planar surface or against a corner defined by the intersection of a second and a third substantially planar surface, said conformable bait container comprising:

a housing defining an interior cavity capable of storing bait, the housing including a back wall and a front wall, each having a longitudinal length, width and depth;

a plurality of openings located on the housing to allow termites to enter the housing and access the bait locatable therewithin;

a pivot axis located along the longitudinal length of the back wall, the pivot axis figuratively dividing the back wall into a first back portion and a second back portion; and a first and a second structurally-weakened area located on the front wall, the first structurally-weakened area offset from the second structurally-weakened area a predetermined distance and defining a removably-detachable front wall section;

wherein the back wall is capable of being located against the first substantially planar surface, and, upon the removal of the removably-detachable front wall section, the back wall is capable of being bent about the pivot axis such that the first back portion and second back portion are capable of being located against the second and the third substantially planar surfaces, respectively, defining the corner.

2. The conformable termite bait container of claim 1 further comprising:

a third structurally-weakened area located on the back wall substantially in juxtaposition with the pivot axis, the third structurally-weakened area to facilitate the bending of the first back portion and second back portion about the pivot axis.

3. The conformable termite bait container of claim 2 wherein the first, second and/or third structurally-weakened areas consist of an indent, a plurality of perforations, a groove and/or a channel.

4. The conformable termite bait container of claim 1 further comprising bait located within the interior cavity of the housing.

5. The conformable termite bait container of claim 4 wherein the bait comprises a plurality of termite-ingestible sheets capable of being bent to substantially conform to the shape of the first back portion and second back portion.

6. The conformable termite bait container of claim 4 wherein the bait comprises a plurality of termite-ingestible segments.

7. A conformable insect bait container capable of being located either against a first substantially planar surface or against a corner defined by the intersection of a second and a third substantially planar surface, said conformable insect bait container comprising:

a housing including a back wall and a front wall, each having a longitudinal length, width and depth, and side structure operatively connected between the front wall and the back wall, wherein the back wall, front wall and side structure form an interior cavity therebetween capable of storing insect bait;

a plurality of openings located along the housing to allow insects to enter the housing and access the insect bait locatable therewithin;

a first structurally-weakened area located along the longitudinal length of the back wall, the first structurally-weakened area figuratively dividing the back wall into a first back portion and a second back portion; and a second and a third structurally-weakened area located along the longitudinal length of the front wall, the second structurally-weakened area offset from the third structurally-weakened area a predetermined distance and defining a removably-detachable front wall section;

wherein the back wall is capable of being located against the first substantially planar surface, and, upon the removal of the removably-detachable front wall section, the back wall is capable of being bent about the first structurally-weakened area such that the first back portion and second back portion are capable of being located against the second and the third substantially planar surfaces, respectively, defining the corner.

8. The conformable insect bait container of claim 7 wherein the first, second and/or third structurally-weakened areas consist of an indent, a plurality of perforations, a groove and/or a channel.

9. The conformable insect bait container of claim 7 further comprising insect bait located within the interior cavity of the housing.

10. The conformable insect bait container of claim 9 wherein the insect bait comprises a plurality of insect-ingestible sheets capable of being bent to substantially conform to the shape of the first back portion and second back portion.

11. The conformable insect bait container of claim 9 wherein the insect bait comprises a plurality of insect-ingestible segments.

12. A conformable termite bait container capable of being located either against a first substantially planar surface or against a corner defined by the intersection of a second and a third substantially planar surface, said conformable termite bait container comprising:

a housing including a back wall and a front wall, each having a longitudinal length, width and depth, and side structure operatively connected between the front wall and the back wall, wherein the back wall, front wall and side structure form an interior cavity therebetween;

termite bait located within the interior cavity of the housing;

a plurality of openings located along the housing to allow termites to enter and exit the housing and access the termite bait located therewithin;

a pivot axis located along the longitudinal length of the back wall, the pivot axis figuratively dividing the back wall into a first back portion and a second back portion; and a first and a second structurally-weakened area located along the longitudinal length of the front wall, the first structurally-weakened area offset from the second structurally-weakened area a predetermined distance and defining a removably-detachable front wall section;

wherein the back wall is capable of being located against the first substantially planar surface, and, upon the removal of the removably-detachable front wall section, the back wall is capable of being bent about the pivot axis such that the first back portion and second back portion are capable of being located against the second and the third substantially planar surfaces, respectively, defining the corner.

13. The conformable termite bait container of claim 12 further comprising:

a third structurally-weakened area located on the back wall substantially in juxtaposition with the pivot axis, the third structurally-weakened area to facilitate the bending of the first back portion and second back portion about the pivot axis.

14. The conformable termite bait container of claim 13 wherein the first, second and/or third structurally-weakened areas consist of an indent, a plurality of perforations, a groove and/or a channel.

15. The conformable termite bait container of claim 12 wherein the termite bait comprises a plurality of termite-ingestible sheets capable of being bent to substantially conform to the shape of the first back portion and second back portion.

16. The conformable termite bait container of claim 12 wherein the termite bait comprises a plurality of termite-ingestible segments.

* * * * *